United States Patent [19]

Drake et al.

[11] Patent Number: 5,800,696

[45] Date of Patent: Sep. 1, 1998

[54] METHOD FOR INHIBITING THE RATE OF COKE FORMATION DURING THE ZEOLITE CATALYZED AROMATIZATION OF HYDROCARBONS

[75] Inventors: Charles A. Drake, Nowata; An-Hsiang Wu, Bartlesville, both of Okla.

[73] Assignee: Phillips Petroleum Company, Bartlesville, Okla.

[21] Appl. No.: 745,527

[22] Filed: Nov. 12, 1996

[51] Int. Cl.$^6$ ................................................ C10G 35/06
[52] U.S. Cl. .................. 208/135; 208/48 R; 208/48 AA; 585/407; 585/408; 585/413; 585/950
[58] Field of Search ........................ 585/407, 408, 585/413, 950; 208/135, 48 R, 48 AA

[56] References Cited

U.S. PATENT DOCUMENTS

| | | | |
|---|---|---|---|
| 4,451,572 | 5/1984 | Cody | 502/62 |
| 4,548,914 | 10/1985 | Chu | 502/85 |
| 4,849,386 | 7/1989 | Wang et al. | 502/62 |
| 4,950,835 | 8/1990 | Wang et al. | 585/467 |
| 4,983,274 | 1/1991 | Chen et al. | 208/111 |
| 5,349,113 | 9/1994 | Chang et al. | 585/475 |
| 5,574,199 | 11/1996 | Beck et al. | 585/407 |

OTHER PUBLICATIONS

Takashi Hibino et al, Journal of Catalysis, vol. 128, No. 2, pp. 551–558, Apr. 1991.

*Primary Examiner*—Walter D. Griffin
*Attorney, Agent, or Firm*—Charles W. Stewart

[57] ABSTRACT

The rate of coke formation during the aromatization of gasoline boiling range hydrocarbons in which the hydrocarbons are contacted with a zeolite catalyst is significantly reduced by providing a concentration of a silylating agent in the hydrocarbon feed.

14 Claims, No Drawings

METHOD FOR INHIBITING THE RATE OF COKE FORMATION DURING THE ZEOLITE CATALYZED AROMATIZATION OF HYDROCARBONS

BACKGROUND OF THE INVENTION

The invention relates to a process for converting non-aromatic hydrocarbons in the presence of a zeolite material to aromatic hydrocarbons. More particularly, the invention relates to the reduction in the rate of coke formation during the aromatization of hydrocarbons in the presence of a zeolite material to thereby enhance the stability of such zeolite material.

It is known to catalytically crack non-aromatic gasoline boiling range hydrocarbons to lower olefins (such as ethylene and propylene) and aromatic hydrocarbons (such as benzene, toluene, and xylenes) in the presence of catalysts which contain a zeolite (such as ZSM-5), as is described in an article by N. Y. Chen et al in Industrial & Engineering Chemistry Process Design and Development, Volume 25, 1986, pages 151–155. The reaction product of this catalytic cracking process contains a multitude of hydrocarbons: unconverted $C_5+$ alkanes, lower alkanes (methane, ethane, propane), lower alkenes (ethylene and propylene), $C_6$–$C_8$ aromatic hydrocarbons (benzene, toluene, xylenes, and ethylbenzene), and $C_9+$ aromatic hydrocarbons.

One concern with the use of zeolite catalysts in the conversion of hydrocarbons in the gasoline boiling range to aromatic hydrocarbons and lower olefins is the excessive production of coke during the conversion reaction. Coke formed during the zeolite catalyzed aromatization of hydrocarbons tends to deposit upon the surface of the zeolite thereby causing deactivation. It is desirable to improve the process for the aromatization of hydrocarbons by minimizing the amount of coke formed during such aromatization reaction process.

SUMMARY OF THE INVENTION

It is an object of this invention to at least partially convert hydrocarbons contained in gasoline to ethylene, propylene and BTX (benzene, toluene, xylene and ethylbenzene) aromatics.

A further object of this invention is to provide an improved process for the aromatization of hydrocarbons in which the rate of coke formation during such aromatization of hydrocarbons is reduced below the rate of coke formation in prior art aromatization processes.

A yet further object of this invention is to provide a method for inhibiting the rate of coke formation during the zeolite catalyzed aromatization of hydrocarbons by adding a silylating agent to the hydrocarbon feed of the aromatization process.

The inventive process provides for the production of lower olefins and aromatics from a hydrocarbon feed stream with a rate of coke formation during the conversion reaction being below that of other similar conversion processes. A feed stream containing gasoline boiling range hydrocarbons undergoes an aromatization step by contacting the feed stream under aromatization reaction conditions with an acid leached zeolite material. Provided in the feed stream contacted with the acid leached zeolite material is a concentration of a silylating agent.

Other objects and advantages of the invention will become apparent from the detailed description and the appended claims.

DETAILED DESCRIPTION OF THE INVENTION

Any catalyst containing a zeolite which is effective in the conversion of non-aromatics to aromatics can be employed in the contacting step of the inventive process. Preferably, the zeolite component of the catalyst has a constraint index (as defined in U.S. Pat. No. 4,097,367) in the range of about 0.4 to about 12, preferably about 2–9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 60:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. It is within the scope of this invention to use zeolites which contain boron and/or at least one metal selected from the group consisting of Ga, In, Zn, Cr, Ge and Sn. The presently more preferred zeolite is ZSM-5.

The catalyst generally also contains an inorganic binder (also called matrix material) preferably selected from the group consisting of alumina, silica, alumina-silica, aluminum phosphate, clays (such as bentonite), and mixtures thereof. Optionally, other metal oxides, such as magnesia, ceria, thoria, titania, zirconia, hafnia, zinc oxide and mixtures thereof, which enhance the thermal stability of the catalyst, may also be present in the catalyst. Preferably, hydrogenation promoters such as Ni, Pt, Pd and other Group VIII noble metals, Ag, Mo, W and the like, should essentially be absent from the catalyst (i.e., the total amount of these metals should be less than about 0.1 weight-%).

Generally, the content of the zeolite component in the catalyst is about 1–99 (preferably about 5–80) weight-%, and the content of the above-listed inorganic binder and metal oxide materials in the zeolite is about 1–50 weight-%. Generally, the zeolite component of the catalyst has been compounded with binders and subsequently shaped (such as by pelletizing, extruding or tableting). Generally, the surface area of the catalyst is about 50–700 $m^2/g$, and its particle size is about 1–10 mm.

Any suitable hydrocarbon feedstock which comprises paraffins (alkanes) and/or olefins (alkenes) and/or naphthenes (cycloalkanes), wherein each of these hydrocarbons contains 5–16 carbon atoms per molecule can be used as the feed in the contacting step of this invention. Frequently these feedstocks also contain aromatic hydrocarbons. Non-limiting examples of suitable, available feedstocks include gasolines from catalytic oil cracking (e.g., FCC) processes, pyrolysis gasolines from thermal hydrocarbon (e.g., ethane) cracking processes, naphthas, gas oils, reformates and the like. The preferred feed is a gasoline-boiling range hydrocarbon feedstock suitable for use as at least a gasoline blend stock generally having a boiling range of about 30°–210° C. Generally, the content of paraffins exceeds the combined content of olefins, naphthenes and aromatics (if present).

The hydrocarbon feed stream can be contacted by any suitable manner with the solid zeolite-containing catalyst contained within the reaction zone of the invention. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst. No significant amount of hydrogen gas is required to be introduced with the feed into the reaction zone of the contacting step, i.e., no $H_2$ gas at all or only insignificant trace amounts of $H_2$ (e.g., less than about 1 ppm $H_2$) which do not significantly affect the processes are to be introduced into these reactors from an external source.

An important aspect of the inventive process is the provision of a concentration of a silylating agent in the hydrocarbon feed stream that is contacted with the zeolite catalyst contained within the aromatization reaction zone of the invention. It has been discovered that the rate of coke formation during the zeolite catalyzed aromatization of a hydrocarbon feedstock is dramatically decreased when a concentration of silylating agent is present in the feedstock. Critical to this invention is for the silylating agent to be present in the hydrocarbon feedstock when it is contacted with the zeolite catalyst under aromatization reaction conditions. Use of a zeolite that has been previously modified by a silylating agent prior to its use as an aromatization catalyst does not provide the kind of reduction in coke formation rate that results from the novel process of utilizing a concentration of silylating agent within the hydrocarbon feed being contacted with the zeolite catalyst under aromatization reaction conditions.

The silylating agent used in the inventive process can be any suitable silicon containing compound which is effective in reducing the rate of coke formation when incorporated into a hydrocarbon feedstock that is contacted with a zeolite under reaction conditions suitable for the aromatization of hydrocarbons. More particularly, the silylating agent is an organosilicon compound selected from compounds having the following molecular formulas:

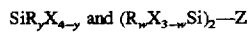

$SiR_yX_{4-y}$ and $(R_wX_{3-w}Si)_2$—Z wherein:

y=1 to 4;

w=1 to 3;

R=alkyl, aryl, H, alkoxy, arylalkyl, and where R has from 1 to 10 carbon atoms;

X=halide; and

Z=oxygen or NH or substituted amines or amides.

The preferred silylating agent is selected from the group of tetra alkyl orthosilicates $(Si(OR)_4)$ and poly(alkyl) siloxane. The most preferred silylating agents are tetra ethyl orthosilicate and poly(phenyl methyl) siloxane.

The concentration of silylating agent in hydrocarbon feed contacted with the zeolite catalyst within the aromatization reaction zone should be sufficient to reduce the rate of coke formation below the rate of coke formation when there is no silylating agent present in the feed. An effective concentration of silylating agent in the hydrocarbon feed can be such that the amount of silicon present is in the range upwardly to about 50 weight percent silicon based on the total weight of hydrocarbon. Preferably, the concentration of silicon can be in the range of from about 0.01 weight percent to about 80 weight percent and, most preferably, from 0.1 to 10 weight percent.

The contacting step is carried out within an aromatization reaction zone, wherein is contained the zeolite catalyst, and under reaction conditions that suitably promote the aromatization of at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from atmospheric pressure upwardly to about 500 psia, preferably, from about 20 psia to about to about 450 psia and, most preferably, from 50 psia to 400 psia.

The flow rate at which the hydrocarbon feed is charged to the aromatization reaction is such as to provide a weight hourly space velocity ("WHSV") in the range of from exceeding 0 $hour^{-1}$ upwardly to about 1000 $hour^{-1}$. The term "weight hourly space velocity", as used herein, shall mean the numerical ratio of the rate at which a hydrocarbon feed is charged to a reaction zone in pounds per hour divided by the pounds of catalyst contained in the reaction zone to which the hydrocarbon is charged. The preferred WHSV of the feed to the contacting zone can be in the range of from about 0.25 $hour^{-1}$ to about 250 $hour^{-1}$ and, most preferably, from 0.5 $hour^{-1}$ to 100 $hour^{-1}$.

A particularly preferred embodiment of the invention is the use of zeolite catalyst that has been subject to an acid treatment step prior to being contacted with the hydrocarbon feed containing a concentration of silylating agent. Any suitable means can be used to acid treat the zeolite catalyst, but it is preferred for the zeolite to be soaked with an acid solution by any suitable means known in the art for contacting the zeolite with such acid solution. The acid of the acid solution can be any acid that suitably provides for the leaching of alumina from the zeolite crystalline structure. The acid solution is preferably an aqueous hydrochloric acid. The zeolite is soaked in the acid solution for a period of from about 0.25 hours to about 10 hours. After soaking, the zeolite is washed free of the acid and then dried and, optionally calcined.

The following examples are presented to further illustrate this invention and should not be construed as unduly limiting the scope of this invention.

Example I

This example describes the two preparations of zeolite used in the aromatization reaction runs of Example II.

A commercially available ZSM-5 catalyst (provided by United Catalysts Inc., Louisville, Ky., under product designation "T-4480") was treated by acid leaching. To acid leach the catalyst, it was soaked in an aqueous HCl solution, having a concentration of 19 weight percent HCl, for two hours at a constant temperature of about 90° C. After soaking, the catalyst was separated from the acid solution and thoroughly washed with water and dried. The acid soaked, washed and dried catalyst was calcined at a temperature of about 500° C. for four hours. This acid leached ZSM-5 catalyst was used in the aromatization reaction runs as described hereafter to determine the coking rate related to its use.

The acid leached ZSM-5 zeolite described above was treated with a silylating agent by using an incipient wetness technique to impregnate it with a 50 weight percent solution of poly(methyl phenyl) siloxane with cyclohexane as the solvent. The impregnated, acid leached ZSM-5 was dried for two hours followed by calcination at 530° C. for six hours. This silylated and calcined acid leached ZSM-5 catalyst was used in an aromatization reaction run as described hereafter to determine the coking rate related to its use.

Example II

This example illustrates the benefit of reduced coke formation rate that results from the inventive process of contacting a hydrocarbon feedstock containing a concentration of a silylating agent with a zeolite. The two zeolite preparations of Example I were used in three aromatization reaction runs the results of which are summarized in Table I. The acid leached zeolite and silylated, acid leached zeolite are the base case zeolite catalysts with which the results of the inventive process are compared.

For each of the aromatization test runs, a sample of 5 g of the particular zeolite catalyst preparation mixed with about 5 cc 10–20 mesh alumina was placed into a stainless steel tube reactor (length: about 18 inches; inner diameter; about 0.5 inch). Gasoline from a catalytic cracking unit of a refinery was passed through the reactor at a flow rate of about 14 ml/hour, at a temperature of about 600° C. and atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples were periodically collected and analyzed by means of a gas chromatograph. After the reaction runs were completed, the coking rate was determined by measuring the amount of coke deposited on the surface of the catalyst.

In the inventive run, the acid leached zeolite catalyst was used. The initial feed charged to the reactor contained 5 volume parts of the gasoline feed for each 2 volume parts of tetra methyl orthosilicate (TEOS) and was fed at a rate of about 12 ml/hr for 2 hours. Subsequently, the gasoline feed without TEOS was charged to the reactor at a rate of 14 ml/hour for 6 hours.

TABLE I

| Catalyst | Coke Rate Wt. %/hr |
|---|---|
| Acid Leached Zeolite | 1.74 |
| Silylated, Acid Leached Zeolite | 0.46 |
| TEOS Addition to Feed Contacted with Acid Leached Zeolite | 0.17 |

As can be seen from the coking rate data presented in Table I, the use of a silylated acid leached zeolite in the aromatization of hydrocarbons resulted in a lower coking rate than that of the acid leached zeolite. Moreover, the addition of a silylating agent to the hydrocarbon feed contacted with the acid leached zeolite during aromatization provides an even more significant reduction in the coking rate when compared with the use of a silylated, acid leached zeolite.

Reasonable variations, modification and adaptations for various operations and conditions can be made within the scope of the disclosure and the appended claims without departing from the scope of this invention.

That which is claimed is:

1. A process for the aromatization of hydrocarbons of a feedstream containing gasoline boiling range hydrocarbons, said process comprises:

providing a concentration of a silylating agent in said feed stream; and contacting said feed stream, having said concentration of said silylating agent, with a composition comprising an acid leached zeolite that has not been modified by a silylating agent prior to contacting said composition with said feedstream, under aromatization reaction conditions.

2. A process as recited in claim 1 wherein the boiling range of hydrocarbons in said feed stream is from about 30° C. to about 210° C.

3. A process as recited in claim 2 wherein said concentration of said silylating agent in said feedstream is effective in reducing the rate of coke formation during the aromatization of the hydrocarbons of said feed stream.

4. A process as recited in claim 2 wherein said concentration of said silylating agent in said feedstream is such that the amount of silicon present is in the range upwardly to about 50 weight percent of the hydrocarbons of said feed stream.

5. A process as recited in claim 4 wherein said silylating agent is an organosilicon compound.

6. A process as recited in claim 5 wherein said contacting step yields a product stream comprising aromatic hydrocarbons.

7. A process as recited in claim 6 wherein said organosilicon compound is selected from the group consisting of tetra alkyl orthosilicate compounds and poly(alkyl) siloxane.

8. A process as recited in claim 7 wherein said tetra alkyl orthosilicate compound is tetra ethyl orthosilicate and said poly(alkyl) siloxane is poly(phenyl methyl) siloxane.

9. A method for reducing the production of coke during the aromatization of hydrocarbons, said method comprises:

contacting under aromatization reaction conditions a hydrocarbon feedstream with a composition comprising an acid leached zeolite that has not been modified by a silylating agent prior to contacting said composition with said feedstream; and providing in said hydrocarbon feed stream a silylating agent in an amount that is effective in reducing the rate of coke formation during the aromatization of said hydrocarbon feed.

10. A process as recited in claim 9 wherein the boiling range of said hydrocarbon feedstream is from about 30°–210° C.

11. A process as recited in claim 10 wherein the amount of silylating agent provided in said hydrocarbon feedstream is such as to provide a concentration of silicon in the range upwardly to about 50 weight percent silicon based on the weight of hydrocarbon in the hydrocarbon feedstream.

12. A process as recited in claim 11 wherein the silylating agent is an organosilicon compound.

13. A process as recited in claim 12 wherein said organosilicon compound is selected from the group consisting of tetra alkyl orthosilicate compounds and poly(alkyl) siloxanes.

14. A process as recited in claim 13 wherein said tetra alkyl orthosilicate compound is tetra ethyl orthosilicate and said poly(alkyl) siloxane is poly(phenyl methyl) siloxane.

* * * * *